(12) United States Patent
Edpalm et al.

(10) Patent No.: US 12,413,748 B2
(45) Date of Patent: Sep. 9, 2025

(54) METHOD AND IMAGE-CAPTURING DEVICE FOR ENCODING IMAGE FRAMES OF AN IMAGE STREAM AND TRANSMITTING ENCODED IMAGE FRAMES ON A COMMUNICATIONS NETWORK

(71) Applicant: Axis AB, Lund (SE)

(72) Inventors: Viktor Edpalm, Lund (SE); Mattias Pettersson, Lund (SE)

(73) Assignee: AXIS AB, Lund (SE)

( * ) Notice: Subject to any disclaimer, the term of this patent is extended or adjusted under 35 U.S.C. 154(b) by 97 days.

(21) Appl. No.: 18/215,177

(22) Filed: Jun. 28, 2023

(65) Prior Publication Data
US 2024/0015307 A1    Jan. 11, 2024

(30) Foreign Application Priority Data
Jul. 6, 2022    (EP) ..................................... 22183384

(51) Int. Cl.
*H04N 19/174*    (2014.01)
*G06T 7/11*    (2017.01)

(52) U.S. Cl.
CPC .............. *H04N 19/174* (2014.11); *G06T 7/11* (2017.01)

(58) Field of Classification Search
CPC .. H04N 19/174; H04N 19/198; H04N 19/167; H04N 19/172; H04N 19/154; H04N 19/124; H04N 19/70; H04N 19/37; H04N 7/18; H04N 19/119; G06T 7/11
See application file for complete search history.

(56) References Cited

U.S. PATENT DOCUMENTS

| | | | |
|---|---|---|---|
| 2003/0112867 A1 | 6/2003 | Hannuksela et al. | |
| 2012/0300836 A1* | 11/2012 | Shimizu | H04N 19/15 375/E7.243 |
| 2014/0036999 A1 | 2/2014 | Ryu et al. | |
| 2015/0010069 A1* | 1/2015 | Guignard | H04N 19/166 375/240.12 |
| 2015/0208095 A1* | 7/2015 | Schierl | H04N 19/70 375/240.28 |

(Continued)

OTHER PUBLICATIONS

Chi et al., "Robust Region-of-Interest Determination Based on User Attention Model Through Visual Rhythm Analysis", IEEE Transactions on Circuits and Systems for Video Technology, vol. 19, No. 7, Jul. 2009, pp. 1025-1038.

(Continued)

*Primary Examiner* — Tracy Y. Li
(74) *Attorney, Agent, or Firm* — XSENSUS LLP

(57) ABSTRACT

A method encodes image frames of an image stream and transmits encoded image frames on a communications network. The method includes receiving and then dividing an image frame into multiple slices defined by first slice parameters and second slice parameters. The method also includes prioritizing the multiple slices and then generating a first encoded image frame having first encoded slices, second encoded slices and one or more first skip blocks. The method then generates and transmits a second encoded image frame having further second encoded slices defined by the second slice parameters and based on encoding second slices and further first encoded slices defined by the first slice parameters with more second skip blocks.

14 Claims, 12 Drawing Sheets

(56) References Cited

U.S. PATENT DOCUMENTS

| | | | |
|---|---|---|---|
| 2018/0176596 A1* | 6/2018 | Jeong | H04N 19/176 |
| 2023/0070492 A1* | 3/2023 | Luo | H04N 19/174 |
| 2023/0076537 A1* | 3/2023 | Pettersson | H04N 19/174 |
| 2023/0308668 A1* | 9/2023 | Pettersson | H04N 19/172 |

OTHER PUBLICATIONS

Tillo et al., "Unequal Protection of Video Data According to Slice Relevance", IEEE Transactions on Image Processing, vol. 20, No. 6, Jun. 2011, pp. 1572-1582.

Go et al., "A systematic reallocation and prioritization scheme for error-resilient transmission of video packets", Multimed Tools Appl., vol. 76, 2017, pp. 6755-6783.

* cited by examiner

METHOD AND IMAGE-CAPTURING DEVICE FOR ENCODING IMAGE FRAMES OF AN IMAGE STREAM AND TRANSMITTING ENCODED IMAGE FRAMES ON A COMMUNICATIONS NETWORK

CROSS-REFERENCE TO RELATED APPLICATION

This application claims priority to European Patent Application No. 22183384.1 filed on Jul. 6, 2022, the entire disclosure of which is incorporated by reference herein.

TECHNICAL FIELD

The embodiments herein relate to a method and an image-capturing device for or transmitting image frames on a communications network. A corresponding computer program and a computer program carrier are also disclosed.

BACKGROUND

Surveillance of the public using imaging, in particular video imaging, is common in many areas around the world. Areas that may need monitoring are for example banks, stores, and other areas where security is needed, such as schools and government facilities. Other areas that may need monitoring are processing, manufacturing and logistics applications where video surveillance is primarily used to monitor processes.

The video is typically streamed over a communication network in order to access the video remotely. In order to stream the video over the communication network video encoding is usually needed. Video encoding is for example a process of preparing the video for output, where a digital video is encoded to meet proper formats and specifications for recording and playback through the use of video encoder software. In other words video encoding is a process of converting RAW images to compressed video files so that they are not saved as individual images but as fluid videos. Encoding may also be used as an umbrella term to describe similar processes relating to altering the size of a video file. Video encoding provides a way to compress image files without compromising the video quality. Both video encoding and encoding often refer to the same process.

In the field of video compression a video frame may be compressed using different algorithms with different advantages and disadvantages, centered mainly around amount of data compression. These different algorithms for video frames may be called picture types or frame types. For example, there may be three different picture types, also referred to prediction types, used in different video algorithms: I, P and B. They are different in the following characteristics:

I-frames are the least compressible but don't require other video frames to decode.

P-frames may use data from previous frames to decompress and are more compressible than I-frames.

B-frames may use both previous and forward frames for data reference to get the highest amount of data compression.

In the H.264/MPEG-4 AVC standard, the granularity of prediction types is brought down to a slice level. A slice is a spatially distinct region of a frame that is encoded separately from any other region in the same frame. I-slices, P-slices, and B-slices take the place of I, P, and B frames.

However, streaming video over a communications network always comes with a risk of dropping packets and thus also video frames or parts of video frames may be dropped when streamed over the communications network. The effect of such dropped packets is that parts of the video may be corrupted by errors. As objects in the video images may be moving the errors may also move around in the video images which may be perceived as disturbing. Example of error effects are trails/garbage left after a moving object, background near an object may move with the object, incorrect or absurd colors and melting images. Some players may refuse to play back anything with errors or anything that depends on earlier parts that had errors.

Video coding according to a standard, such as a H.264 standard, may specify that the slices must be encoded and transmitted in a specific order, e.g., starting from the top left corner and ending with the bottom right corner of an image frame which is inputted to the encoder. Each slice may be placed in its own Network Abstraction Layer (NAL) unit, and then each NAL unit may get packetized into a series of Internet Protocol (IP) packets which are sent over a communications network. Statistically the first packets have a higher probability to get through the communications network to a receiving device than the later packets. If the later packets comprise slices with content with a higher relevance than the content of slices in earlier packets then there is a bigger risk of losing high-priority content than the risk of losing low-priority content. This may for example be the case for the slices from surveillance cameras which are typically directed such that the most interesting part of the scene is depicted in the middle of the video frame, while the standard specifies that slices must be encoded and transmitted in a specific order starting from the top left corner and ending with the bottom right corner of an image frame which is inputted to the encoder.

Video coding according to a baseline profile of the H.264 standard comprises a solution for this problem, namely flexible macroblock ordering, FMO. FMO means that it is possible to freely select which macroblocks to send first (and have a biggest chance of being successfully transmitted). Document US 2003 112 867 discloses a method for encoding and sending video data over a communication channel wherein a video frame may be sliced into a first tile group (slice1) covering a center portion of the video frame corresponding to a region of interest (ROI) and the area around the ROI is sliced into a second tile group (slice2) comprising non-ROI data and wherein the ROI is encoded and placed in the bitstream before the non-ROI data.

US 2003 112 867 discloses a method for video frame encoding and transmission, wherein a video frame is determined to comprise an area of higher relevance and slicing the video frame and grouping the slices into sub-groups, a first group corresponding to the area of higher relevance in the video frame and a second group comprising the background, and wherein the first group is prioritized during transmission over a wireless network.

US 2014 036 999 discloses slice group priority assigning wherein a higher priority slice group may be a center portion of a video frame and wherein the higher priority slice groups are transmitted first (QoS).

However, solutions based on FMO is not generally supported since it is technically complex.

SUMMARY

An object of embodiments herein may thus be to obviate some of the problems mentioned above, or at least reduce the impact of them. Specifically, an object may be to improve the transport of packets over the communications network.

As mentioned above, when packet dropping happens, it may be preferable to be able to prioritize which parts of a video frame or packages are dropped, at least on a statistical level. In an example a frame is sent in a bunch of packets. The first packets may have a higher probability to get through the communications network to a receiving device than the later packets. Thus, later parts of the frame may be dropped on the communications network. This is not optimal since a surveillance camera is typically directed such that the most interesting part of the scene is depicted in the middle of the video frame.

Embodiments herein discloses a solution which is compatible with the currently used standard, i.e., which is compatible with transmitting slices of a frame in a predefined ordered way, and lowers the probability of dropping slices with higher priority content.

According to an aspect, the object is achieved by a method, performed by an image-capturing device, for encoding image frames of an image stream and transmitting encoded image frames on a communications network.

The method comprises receiving an image frame of the image stream from an image sensor of the image-capturing device.

The method further comprises dividing the image frame into multiple slices wherein the multiple slices comprises one or more first slices defined by first slice parameters and one or more second slices defined by second slice parameters.

The method further comprises prioritizing the multiple slices such that the one or more first slices are prioritized over the one or more second slices.

The method further comprises generating a first encoded image frame comprising one or more first encoded slices defined by the first slice parameters and based on encoding the one or more first slices and comprising one or more second encoded slices defined by the second slice parameters and comprising one or more first skip blocks.

The method further comprises generating a second encoded image frame comprising one or more further second encoded slices defined by the second slice parameters and based on encoding the one or more second slices and comprising one or more further first encoded slices defined by the first slice parameters and comprising one or more second skip blocks.

The method further comprises transmitting the first encoded image frame before the second encoded image frame on the communications network to a receiving device.

For each encoded image frame the encoded slices may be sent according to a first order, e.g., as specified in a video compression standard.

According to another aspect, the object is achieved by an image-capturing device configured to perform the above method.

According to further aspects, the object is achieved by a computer program and a computer program carrier corresponding to the aspects above.

For each encoded image frame the encoded slices may be sent in a first (normal) order, such as specified by a video compression standard, to fulfil requirements on transmission of the slices, while prioritization of the original slices is performed on a frame level by incorporating differently prioritized slices in different encoded frames associated with the same input frame received from the image sensor and transmitting the encoded frames associated with the same input frame according to a second order. The second order may be based on a prioritization of the content of the slices of the respective input frame.

Since the first encoded image frame is transmitted before the second encoded image frame, e.g., according to the second order, to the receiving device on the communications network a probability of losing the prioritized slice is less.

A further advantage of embodiments herein is that errors due to lost communication packets, such as IP packets, and thus lost slices, do not spread to other slices when the slices are encoded such that the encoded slices are independent of other encoded slices originating from the same received frame, e.g., from the same raw input frame.

BRIEF DESCRIPTION OF THE DRAWINGS

In the figures, features that appear in some embodiments are indicated by dashed lines.

The various aspects of embodiments disclosed herein, including particular features and advantages thereof, will be readily understood from the following detailed description and the accompanying drawings, in which.

DETAILED DESCRIPTION

Figure 1:
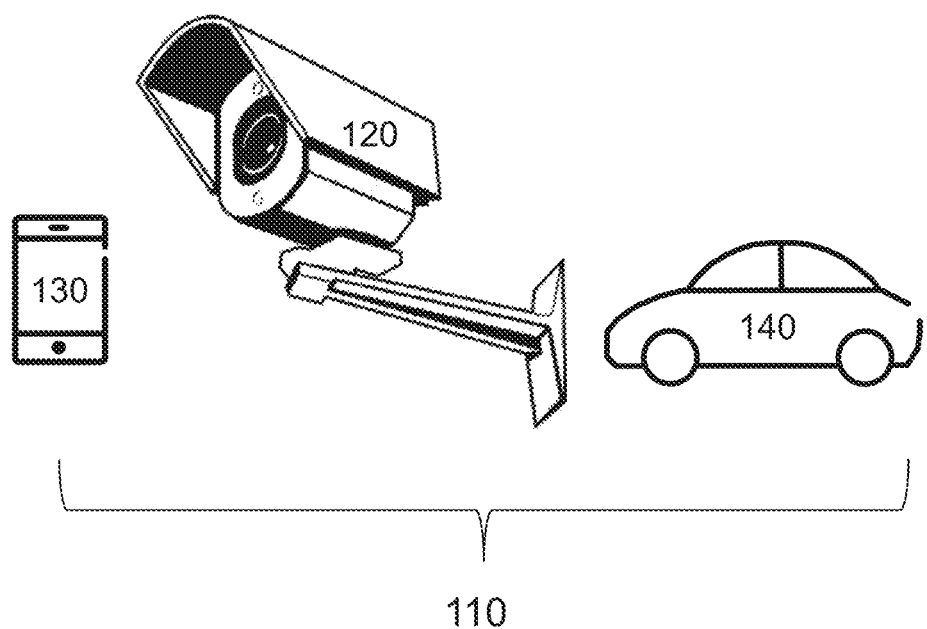
FIG. 1 illustrates exemplifying embodiments of image-capturing devices.

Embodiments herein may be implemented in one or more image-capturing devices, e.g. a digital camera. FIG. 1 depicts various exemplifying image-capturing devices 110. The image-capturing device 110 may e.g., be or comprise any of a camcorder, a network video recorder, a camera, a video camera 120 such as a surveillance camera or a monitoring camera, a digital camera, a wireless communication device 130, such as a smartphone, including an image sensor, or a car 140 including an image sensor.

Figure 2A:
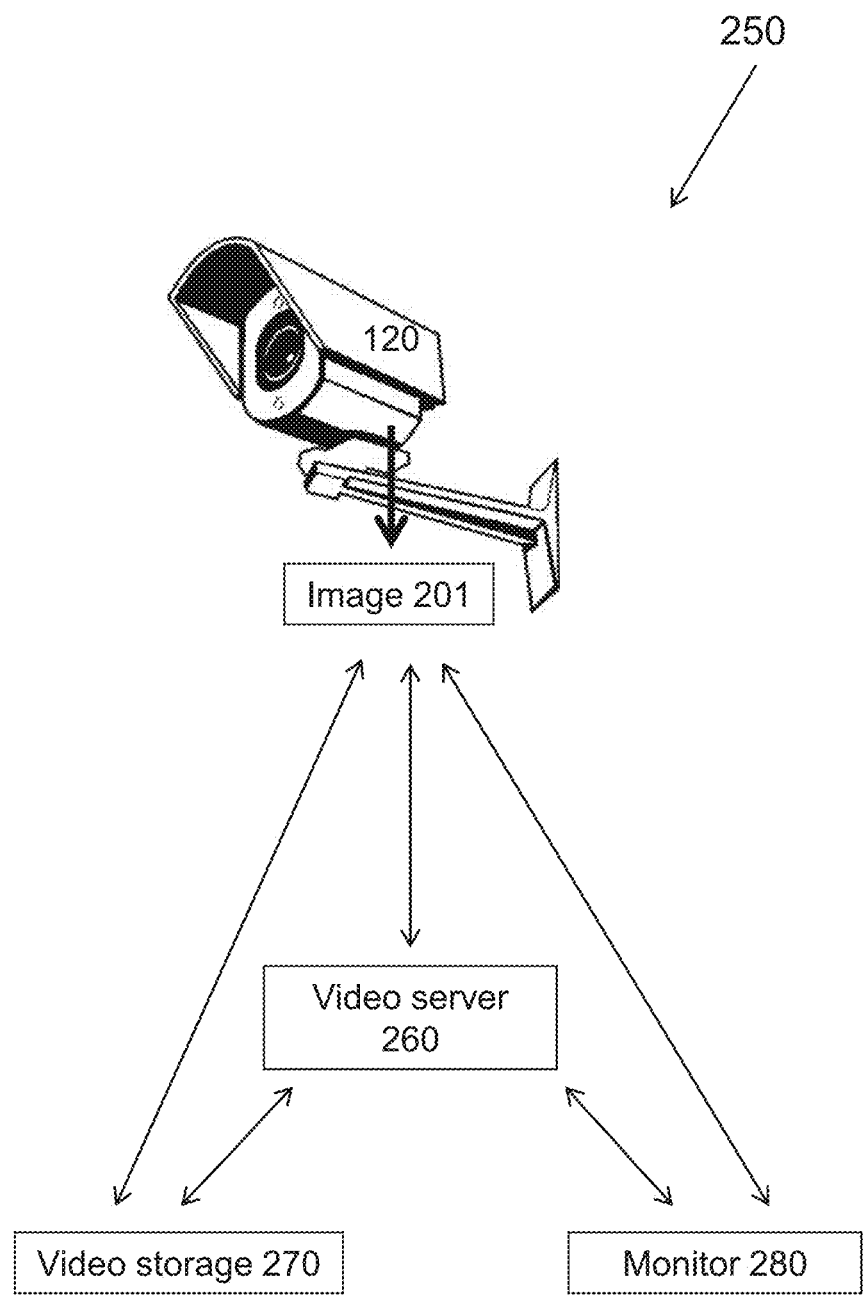
FIG. 2a illustrates exemplifying embodiments of a video network system.

FIG. 2a depicts an exemplifying video network system 250 in which embodiments herein may be implemented. The video network system 250 may include an image-capturing device, such as the video camera 120, which can capture and perform image processing on a digital image 201, such as a digital video image. A video server 260 in FIG. 2a may obtain the image, for example from the video camera 120 over a network or the like, which is indicated in FIG. 2a with the double-pointing arrows.

The video server 260 is a computer-based device that is dedicated to delivering video. Video servers are used in a number of applications, and often have additional functions and capabilities that address the needs of particular applications. For example, video servers used in security, surveillance and inspection applications typically are designed to capture video from one or more cameras and deliver the video via a computer network. In video production and broadcast applications, a video server may have the ability to record and play recorded video, and to deliver many video streams simultaneously. Today, many video server functions may be built-in in the video camera 120.

However, in FIG. 2a, the video server 260 is connected over the video network system 250, to the image-capturing device 110 exemplified by the video camera 120. The video server 260 may further be connected to a video storage 270 for storage of video images, and/or connected to a monitor 280 for display of video images. In some embodiments the video camera 120 is connected directly with the video storage 270 and/or the monitor 280, as indicated by the direct arrows between these devices in FIG. 2a. In some other embodiments the video camera 120 is connected to the video storage 270 and/or the monitor 280 via the video server 260, as indicated by the arrows between the video server 260 and the other devices.

Figure 2B:
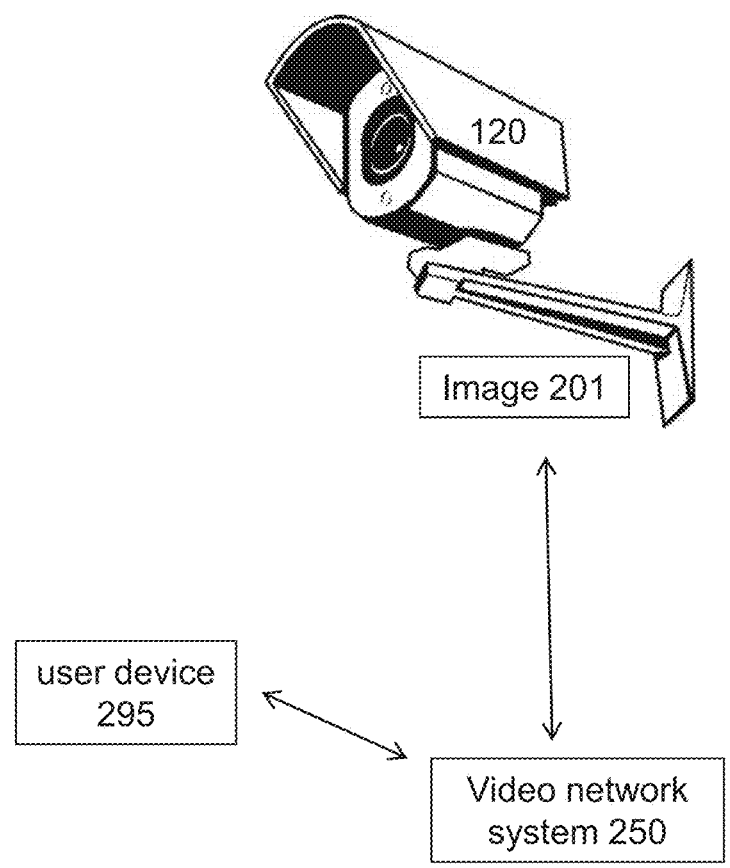
FIG. 2b illustrates exemplifying embodiments of a video network system and a user device.

FIG. 2b depicts a user device 295 connected to the video camera 120 via the video network system 250. The user device 295 may for example be a computer or a mobile phone. The user device 295 may e.g., control the video camera 120 and/or display video emanating from the video camera 120. The user device 295 may further include both the functionality of the monitor 280 and the video storage 270.

In order to better understand embodiments herein an imaging system will first be described.

Figure 3A:
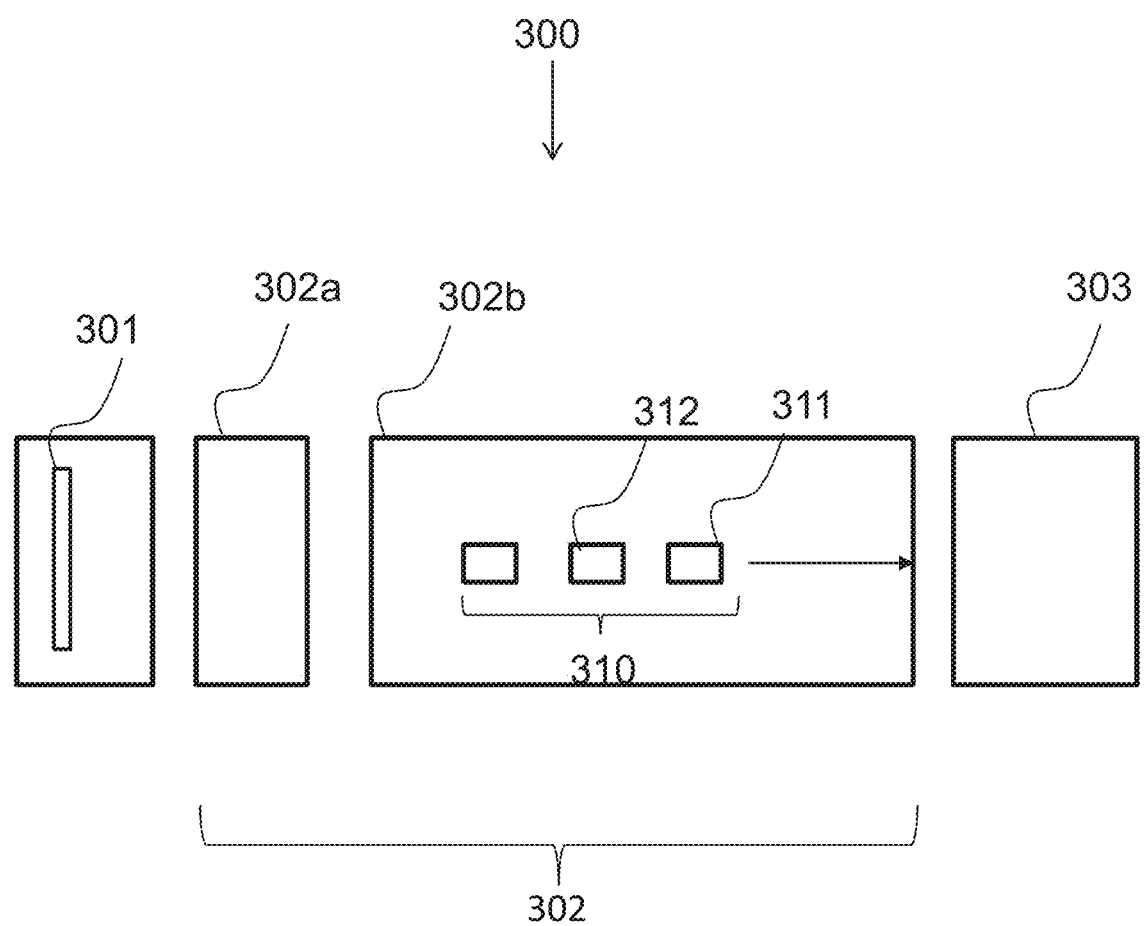
FIG. 3a is a schematic block diagram illustrating an exemplifying embodiment of an imaging system.

FIG. 3a is a schematic view of an imaging system 300, in this case of a digital video camera, such as the video camera 120. The imaging system images a scene on an image sensor 301. The image sensor 301 may be provided with a Bayer filter, such that different pixels will receive radiation of a particular wavelength region, in a known pattern. Typically, each pixel of the captured image is represented by one or more values representing the intensity of the captured light within a certain wavelength band. These values are usually referred to as colour components, or colour channels. The term "image" may refer to an image frame or video frame including information originating from an image sensor that has captured the image.

After having read the signal of individual sensor pixels of the image sensors 301, different image processing actions may be performed by an image processing pipeline 302. The image processing pipeline 302 may comprise an image processing part 302a and a video post-processing part 302b.

Typically for video processing the images are comprised in a stream of images. FIG. 3a illustrates a first video stream 310 from the image sensor 301. The first image stream 310 may comprise multiple captured image frames, such as a first captured image frame 311 and a second captured image frame 312.

Image processing may comprise demosaicing, color correction, noise filtering (for eliminating spatial and/or temporal noise), distortion correction (for eliminating effects of, e.g., barrel distortion), global and/or local tone mapping (e.g., enabling imaging of scenes containing a wide range of intensities), transformation (e.g., rectification and rotation), flat-field correction (e.g., for removal of the effects of vignetting), application of overlays (e.g., privacy masks, explanatory text), etc. The image processing pipeline 302 may also be associated with an analytics engine performing object detection, recognition, alarms, etc.

The image processing part 302a may e.g. perform image stabilization, apply noise filtering, distortion correction, global and/or local tone mapping, transformation, and flat-field correction. The video post-processing part 302b may for example crop parts of an image, apply overlays, and comprise the analytics engine.

Following the image processing pipeline 302 the image may be forwarded to an encoder 303, wherein the information in the image frames is coded according to an encoding protocol, such as H.264. The encoded image frames are then forwarded to for example a receiving client, exemplified here with the monitor 280, to the video server 260, the storage 270, etc.

The video coding process produces a number of values that may be encoded to form a compressed bit stream. These values may include:
- quantized transform coefficients,
- information to enable the decoder to re-create a prediction,
- information about a structure of the compressed data and compression tools used during encoding, and
- information about the complete video sequence.

These values and parameters (syntax elements) are converted into binary codes using for example variable length coding and/or arithmetic coding. Each of these encoding methods produces an efficient, compact binary representation of the information, also referred to as an encoded bit stream. The encoded bit stream may then be stored and/or transmitted.

As mentioned above it may be of interest to improve encoding of video images of a video stream and transmission of the video stream over a communications network in order to reduce the effects of dropped data packets over the communications network.

Figure 3B:
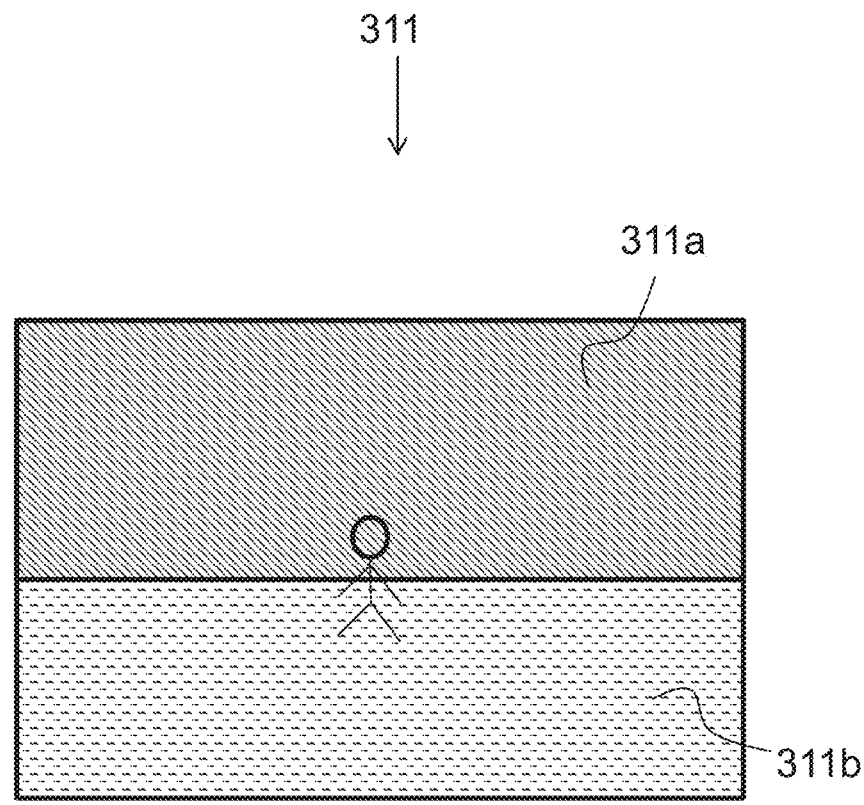
FIG. 3b is a schematic block diagram illustrating a reference method in an image-capturing device.
Figure 3B:

In order to better understand embodiments herein a reference method for encoding and transmitting image frames will first be presented with reference to FIG. 3b.

As mentioned above,

The first captured image frame 311 is encoded by the encoder 303 by dividing the first captured image frame 311 into multiple parts which are referred to as slices. In FIG. 3b the first captured image frame 311 has been divided into two slices: a first slice 311a and a second slice 311b. The other image frames, such as the second captured image frame 312, are also divided into slices. Thus, the second captured image frame 312 has been divided into two slices: a first slice 312a and a second slice 312b.

According to standard encoding techniques the slices may be encoded and transmitted in a specific order, e.g., starting from the top left corner and ending with the bottom right corner of the image frame which is inputted to the encoder 303. Each slice may be placed in its own Network Abstraction Layer (NAL) unit, and then each NAL unit may get packetized into a series of Internet Protocol (IP) packets which are sent over a communications network such as the video network system 250.

However, dropped data packets over the communications network may be a problem. The first parts of the encoded image frame may have a higher probability to get through the communications network to a receiving device than the later parts. Thus, later parts of the encoded image frame may be dropped on the communications network. This is not optimal since a surveillance camera is typically directed such that the most interesting part of the scene is depicted in the middle of the video frame.

One way of solving this problem is by providing an image-capturing device configured to slice (or tile) an input image into several parts, move each part (or group of parts) into a separate frame, arranged in priority order, with empty areas replaced with pre-generated empty slices. Thus, for each encoded frame the slices may be sent in a first (e.g., normal) order or according to a first set of priorities, such as specified by a video compression standard, in order to fulfil requirements on transmission of the slices, while prioritization of the original slices is performed on frame level by incorporating differently prioritized slices in different encoded frames associated with the same input frame received from the image sensor and transmitting the encoded frames associated with the same input frame according to a second order. The second order may be based on a prioritization of the content of the slices of the respective input frame. The second order may differ from the first order. The second order may also be referred to as a second set of priorities. Thus, first and second encoded frames associated with the same input frame are transmitted in the second order, e.g., according to the second set of priorities. For example, based on the content of the input slices encoded slices are distributed into the set of encoded frames associated with the same input frame such that the encoded slice with the highest priority according to the content is transmitted first. Within each encoded frame associated with the same input frame the slices are transmitted according to the first priority, e.g., according to the standard specification.

The separate frames may then be combined at the decoder side into one frame much like normal video frames are combined into a result at a particular time. An empty slice functions like an empty frame and may be generated like an empty frame. The empty frame may be a frame with no encoded difference in relation to a previous frame of an encoded image stream. In some embodiments the empty frame may be a pre-computed encoded frame. With a pre-computed encoded frame is meant that instead of producing an encoded frame with the encoder 303, the encoded frame is produced in advance by a software algorithm, e.g., by encoding every empty frame in the same way. Thus, the empty frame may be a pre-computed encoded frame with no encoded difference in relation to the previous frame of the encoded image stream. For example, such a pre-computed empty frame may comprise one or more macroblocks indicating that there has been no change in relation to the previous frame. Such change may for example relate to the image content of the previous frame, such as the pixel values. Thus, the empty slice may be a slice with no encoded difference in relation to a previous slice of the encoded image stream.

For example, the normal OP quantization parameter (QP) value per slice, or base QP per frame, in the Slice Header according to the H.264/H.265 standard may be set to QP 51. For empty frames, e.g. frames without encoded block residuals, the QP is not used by the decoder, and if QP 51 is never used by the encoder 303 it may be used as a "flag" to indicate the empty slice. An advantage of using the QP-value is that there is no need for any extra handling of it since it is already a part of the video ready to be used.

All frames except a last frame out of a group of frames that were created from a same single frame may be marked as no-display to avoid strange visual effects, such as partial image updates. Further, motion vector search may be restricted to only within each slice/tile.

Exemplifying embodiments herein will now be described with reference to FIGS. 4a, 4b, 4c, 4d, 4e and 5 and with further reference to FIGS. 1, 2a, 2b and 3a.

Figure 4A:
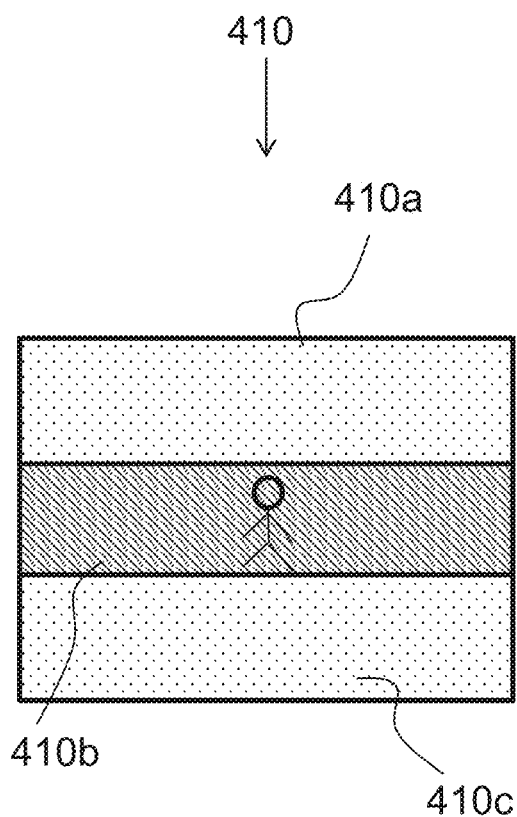
FIG. 4a is a schematic block diagram illustrating embodiments of a method in an image-capturing device.

FIG. 4a illustrates embodiments of a method for encoding in the image-capturing device 110. In particular the embodiments may be performed by the encoder 303. An image frame 410 may be divided into multiple slices 410a, 410b, 410c, wherein the multiple slices 410a, 410b, 410c comprises one or more first slices 410b defined by first slice parameters and one or more second slices 410a, 410c defined by second slice parameters. In FIG. 4a the one or more first slices 410b are illustrated with a different filling pattern than the one or more second slices 410a, 410c. In the example of FIG. 4a the one or more first slices 410b is a single slice, while the one or more second slices 410a, 410c comprise two slices.

Figure 5:
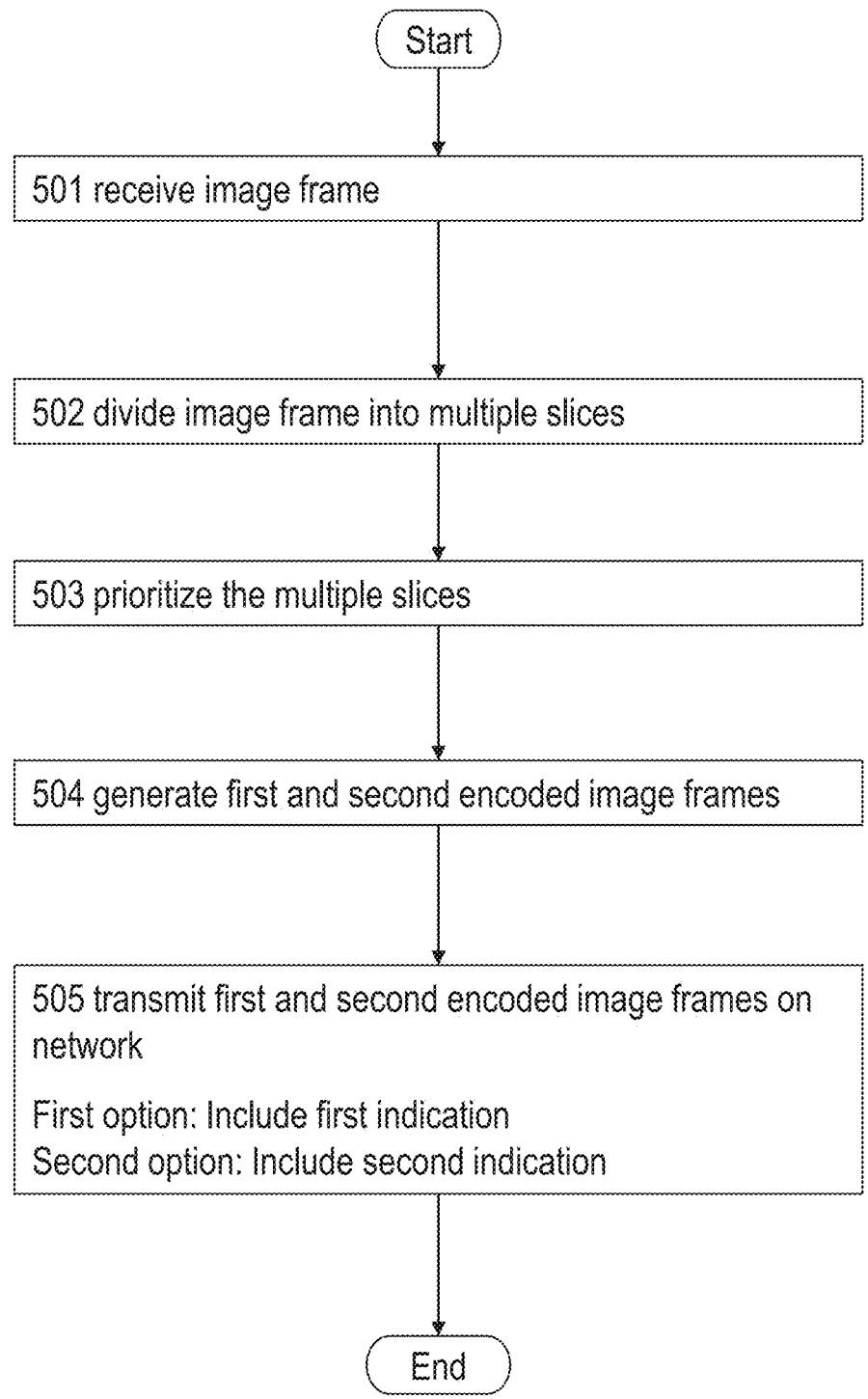
FIG. 5 is a flowchart illustrating embodiments of a method in an image-capturing device.

FIG. 5 illustrates a flowchart describing a method, performed by the image-capturing device 110, for encoding image frames 311, 410 of an image stream 310 and transmitting encoded image frames 411, 412 on a communications network, such as the video network system 250.

Action 501

The image-capturing device 110 receives captured image frames 311, 410 of the image stream 310 from the image sensor 301 of the image-capturing device 110. For example, the encoder 303 may receive the captured image frames 311, 410 of the image stream 310 from the image sensor 301. The image-capturing device 110 may receive a full raw frame.

Action 502

The image-capturing device 110 divides the image frame 311, 410 into multiple slices 410a, 410b, 410c. The multiple slices 410a, 410b, 410c comprises one or more first slices 410b defined by first slice parameters and one or more second slices 410a, 410c defined by second slice parameters. The slice parameters may comprise a size and a position within the frame of the slices.

The multiple slices 410a, 410b, 410c may be of equal size. In one embodiment the input image 410 is divided and encoded into three slices of equal size. For example, the multiple slices 410a, 410b, 410c may further comprise one or more third slices 410c defined by third slice parameters.

The image partitioning may be dynamic to better cover the most important parts of the video which may change. For example, the number, size and position of the slices may be changed dynamically.

Action 502 may be performed by the encoder 303.

Action 503

The image-capturing device 110 prioritizes the multiple slices 410a, 410b, 410c such that the one or more first slices 410b are prioritized over the one or more second slices 410a, 410c.

Prioritization may be based on the content of the multiple slices 410a, 410b, 410c. For example, One or more slices may be grouped into a same priority group. For example the one or more second slices 410a, 410c may be grouped into a second priority group with lower priority than the one or more first slices 410b in a first priority group.

In some embodiments herein, in which the raw frame is divided and encoded into three slices, a middle slice gets the highest priority, while the other two slices gets a lower priority. Thus, in these embodiments the middle slice may be comprised in the one or more first slices 410b which are prioritized over the other two slices comprised in the one or more second slices 410a, 410c.

In some other embodiments herein prioritizing the multiple slices 410a, 410b, 410c comprises prioritizing the one or more second slices 410a over the one or more third slices 410c.

Action 504

Figure 4B:
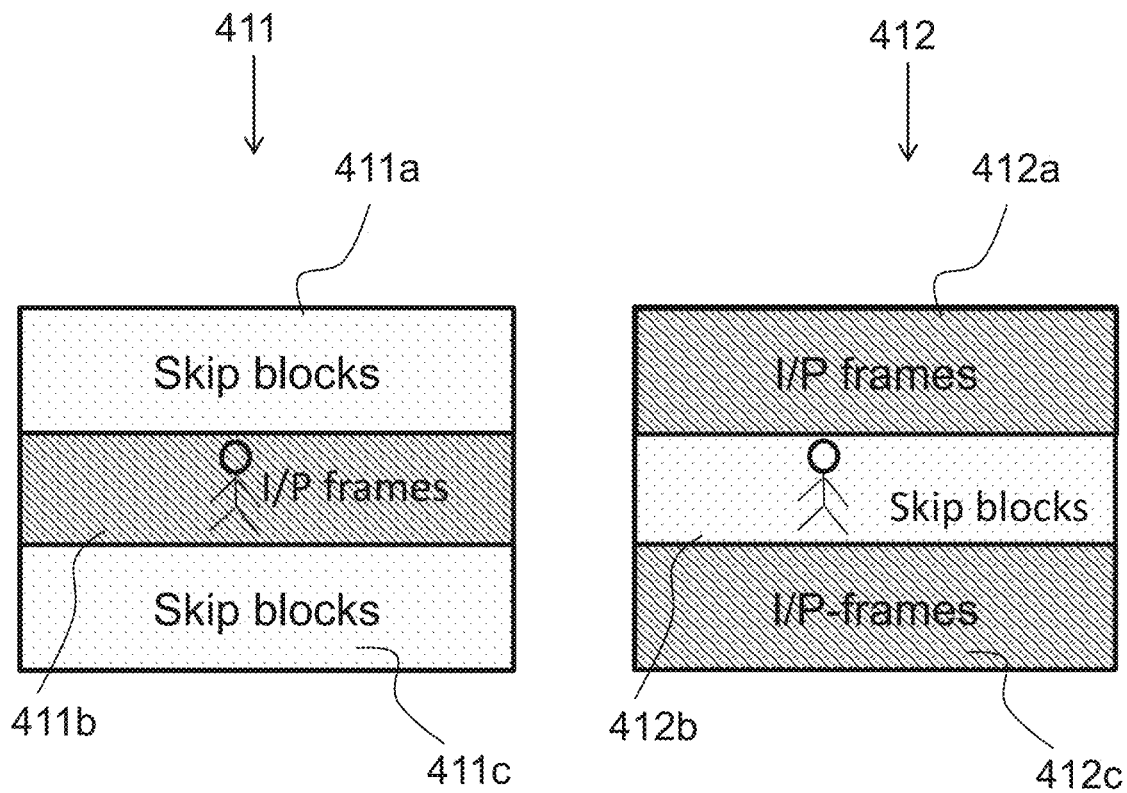
FIG. 4b is a schematic block diagram illustrating embodiments of a method in an image-capturing device.
Figure 4B:
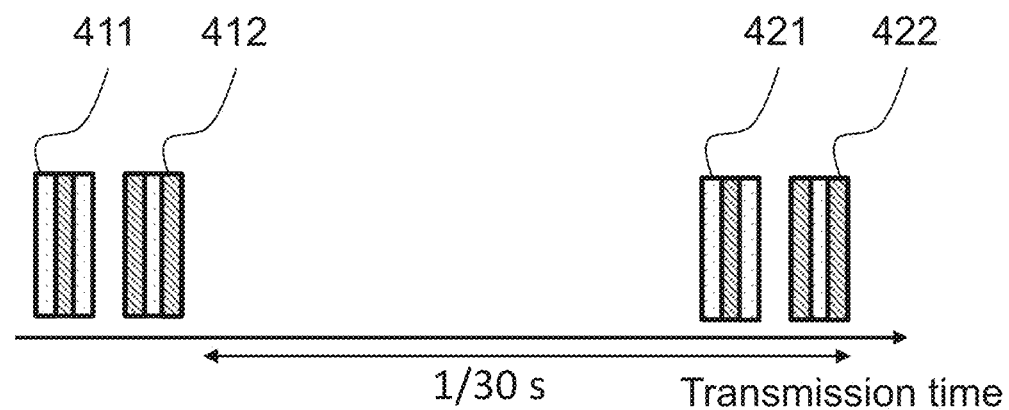

FIG. 4b illustrates first and second encoded image frames 411, 412.

The image-capturing device 110 generates a first encoded image frame 411 comprising one or more first encoded slices 411b defined by the first slice parameters and based on encoding the one or more first slices 410b, and comprising one or more second encoded slices 411a, 411c defined by the second slice parameters and comprising one or more first skip blocks.

The skip blocks may indicate that there is no encoded difference between the encoded image frame 421, 422 including the skip blocks and a previous encoded image frame 411, 412 for a part of the encoded image frame 421, 422 that the skip blocks cover.

The image-capturing device 110 further generates a second encoded image frame 412 comprising one or more further second encoded slices 412a, 412c defined by the second slice parameters and based on encoding the one or more second slices 410a, 410c, and comprising one or more further first encoded slices 412b defined by the first slice parameters and comprising one or more second skip blocks.

Generating the encoded image frames 411, 412 may comprise encoding the multiple slices 410a, 410b, 410c such that a respective encoded slice 410a, 410b, 410c of multiple encoded slices 411a, 411b, 411c is independent of every other encoded slice 411a, 411b, 411c of the multiple encoded slices 411a, 411b, 411c.

Thus, each encoded slice 411a, 411b, 411c may be independent of the other encoded slices 411a, 411b, 411c originating from a same received input image frame 410. For example, in some embodiments herein the one or more first encoded slices 411b doesn't depend on the one or more second encoded slices 411a, 411c.

But a slice in an encoded image frame associated with a different input image frame, e.g., associated with a previous or later input image frame, may depend on a previous or later slice. For example, if an object moves across the slices, for the one or more second encoded slices 411a, 411c the encoder can't use motion vectors that point into the one or more first encoded slices 411b. Instead, the moving object will have to be painted up with I-blocks when it enters the one or more second encoded slices 411a, 411c. This is more costly in respect of computing and transmission resources but restricts the dependency. As soon as the object is within the one or more second encoded slices 411a, 411c, then motion vectors may be used, e.g. so that the one or more second encoded slices 411a, 411c depends on corresponding encoded slices associated with a previous or later image frame, such as a previous or later input frame or a previous or later encoded frame. In embodiments herein the previous or later encoded image frame refers to a set of encoded image frames which are associated with the same received input frame.

For example, motion vector search may be restricted to only within each slice. This means that there is no prediction over the slice borders. This will prevent errors from propagating between the encoded slices.

The generation of the encoded frames will be exemplified with two approaches below:

1. The encoder 303 runs two passes of the input image frame 311, 410 that each produces an encoded output frame 411, 412 with multiple, e.g., three, encoded slices and is requested per slice to either produce real slice data or fill with skip blocks.

Figure 4C:
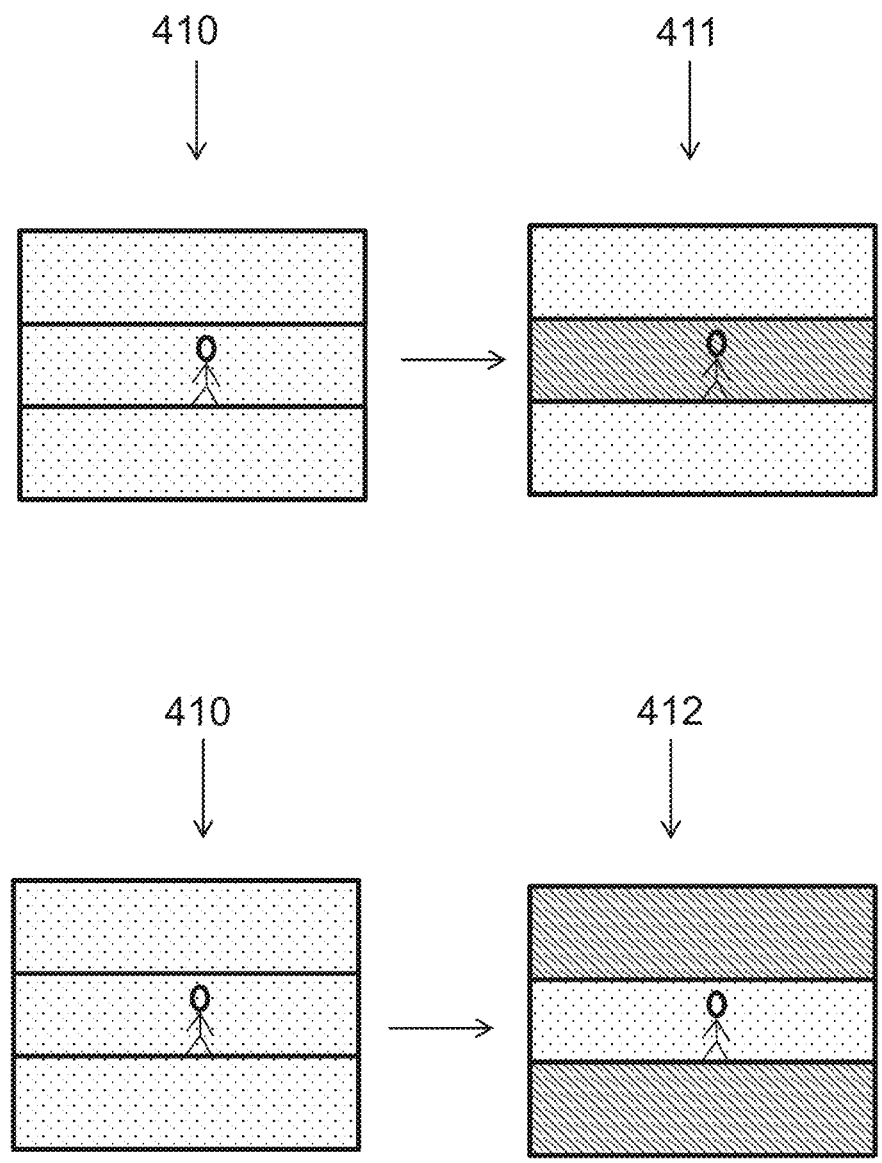
FIG. 4c is a schematic block diagram illustrating embodiments of a method in an image-capturing device.

The first approach is illustrated in FIG. 4c where the input frame 410 is encoded twice: a first time into the first encoded frame 411 and a second time into the second encoded frame 412.

Figure 4D:
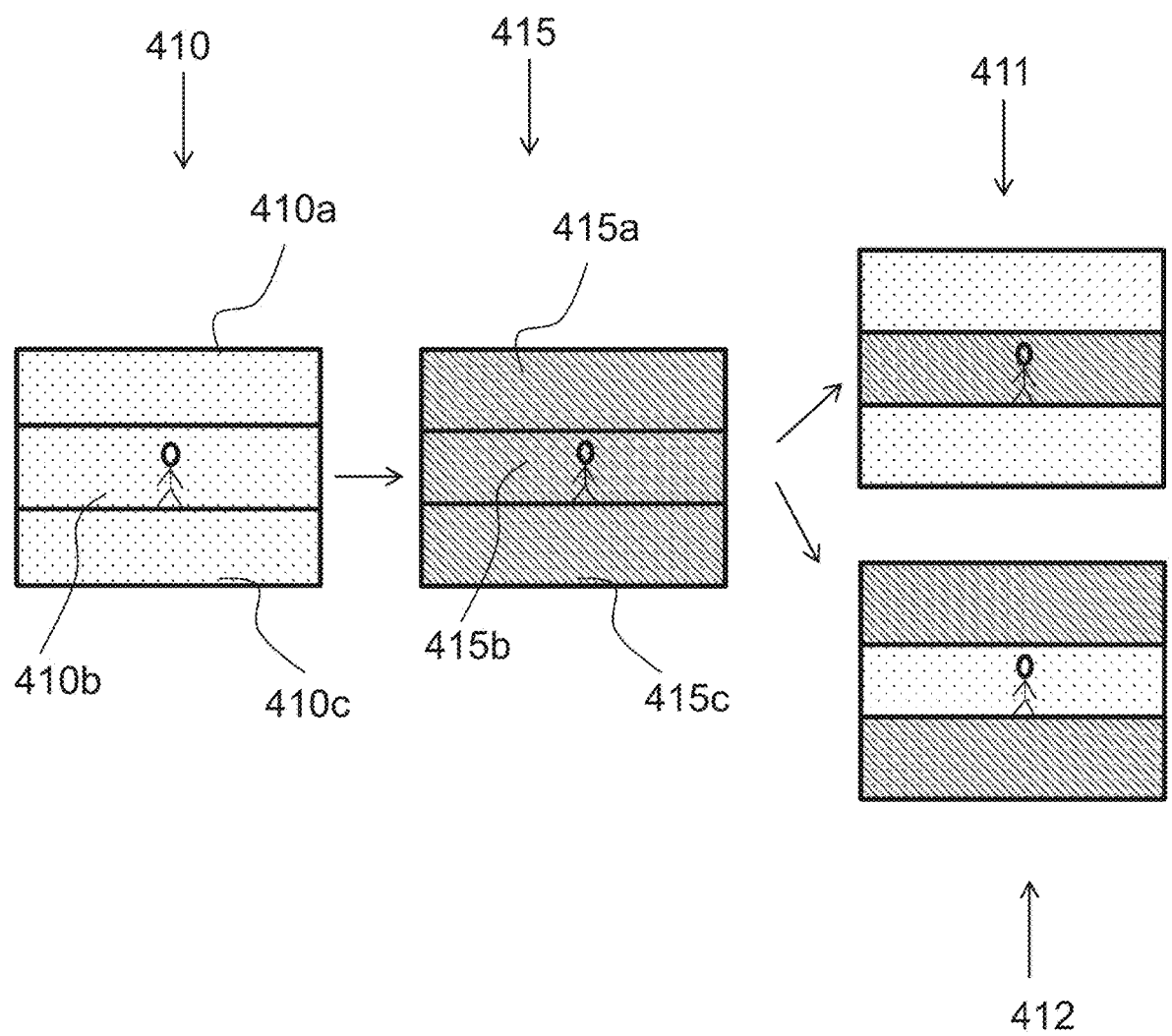
FIG. 4d is a schematic block diagram illustrating embodiments of a method in an image-capturing device.

2. The frame is encoded in multiple, e.g., two, slices into an intermediate encoded image frame 415. The second approach is illustrated in FIG. 4d. The intermediate encoded image frame 415 may comprise multiple encoded slices, such as one or more first encoded slices 415b of the intermediate encoded image frame 415 and one or more second encoded slices 415a, 415c of the intermediate encoded image frame 415.

Then multiple, e.g., two, output frames are constructed by selecting encoded slice data for some slices and fill up with skip block for other slices. Thus, the intermediate encoded image frame 415 may be used to generate the first encoded image frame 411 and the second encoded image frame 412.

Thus, in some embodiments herein generating the first encoded image frame 411 comprises encoding the multiple slices 410a, 410b, 410c such that the one or more first slices 410b are encoded into one or more first encoded slices 411b of the first encoded image frame 411 and the one or more second encoded slices 411a, 411c of the first encoded image frame 411 are generated by replacing the one or more second slices 410a, 410c with the second skip blocks. Then generating the second encoded image frame 412 comprises encoding the multiple slices 410a, 410b, 410c such that the one or more second slices 410a, 410c are encoded into the one or more further second encoded slices 412a, 412c of the second encoded image frame 412 and the one or more further first encoded slices 411a, 411c are generated by replacing the one or more first slices 410b with the one or more first skip blocks.

In some other embodiments generating the first encoded image frame 411 and generating the second encoded image frame 412 comprises generating the intermediate encoded image frame 415 based on encoding the image frame 311, 410 by encoding the multiple slices 410a, 410b, 410c such that the one or more first slices 410b are encoded into one or more first encoded slices 415b of the intermediate encoded image frame 415 and the one or more second slices 410a, 410c are encoded into one or more second encoded slices 415a, 415c of the intermediate encoded image frame 415. Then generating the first encoded image frame 411 further comprises inserting the one or more first encoded slices 415b of the intermediate encoded image frame 415 into the first encoded image frame 411 and inserting skip blocks instead of the one or more second encoded slices 415a, 415c of the intermediate encoded image frame 415, and wherein generating the second encoded image frame 412 further comprises inserting the one or more second encoded slices 415a, 415c of the intermediate encoded image frame 415 into the second encoded image frame 412 and inserting skip blocks instead of the one or more first encoded slices 411b of the intermediate encoded image frame 415 into the second encoded image frame 412.

Figure 4E:
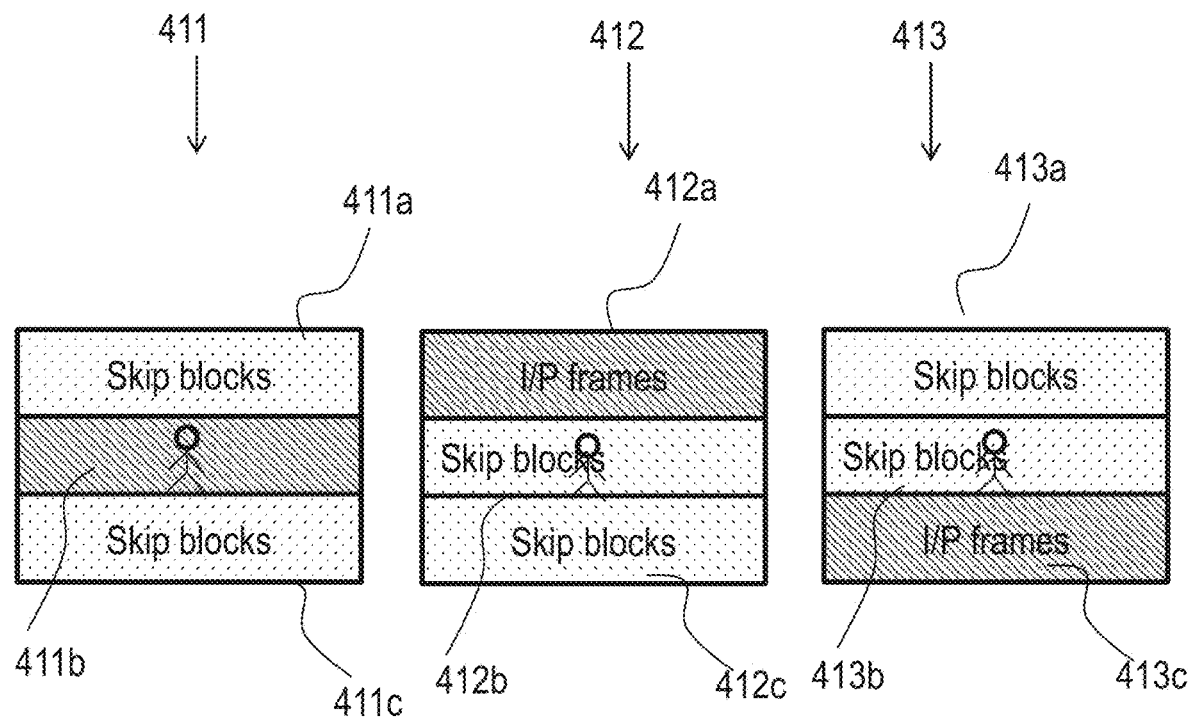
FIG. 4e is a schematic block diagram illustrating embodiments of a method in an image-capturing device.
Figure 4E:
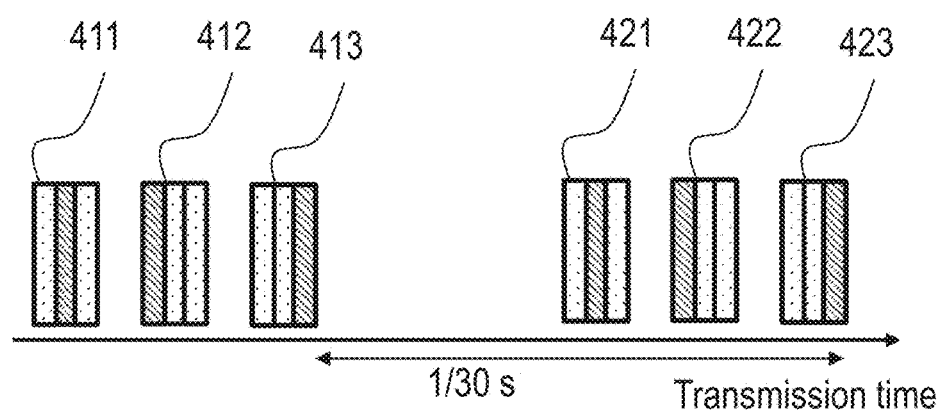

FIG. 4e illustrates some embodiments when the multiple slices 410a, 410b, 410c comprises one or more third slices 410c defined by third slice parameters. Then the generated first encoded image frame 411 may further comprise one or more third encoded slices 411c defined by the third slice parameters and comprising one or more third skip blocks, and the generated second encoded image frame 412 may further comprise the one or more third encoded slices 411c.

These embodiments may further comprise generating a third encoded image frame 413 comprising one or more further third encoded slices 413c defined by the third slice parameters and based on encoding the one or more third slices 410c, and comprising the one or more further first encoded slices 412b defined by the first slice parameters and comprising the one or more second skip blocks, and comprising the one or more second encoded slices 411a defined by the second slice parameters and comprising the one or more first skip blocks.

Action 505

In order to meet a requirement of transmitting slices of an encoded frame in a specific order, which may not be based on a priority of the content of the slices, the image-capturing device 110 transmits the encoded slices of the respective encoded image frame 411, 412 according to the first set of priorities and transmits the encoded image frames 411, 412 generated from the same received image frame 410 according to the second set of priorities. As mentioned above, the first set of priorities may be based on a standard requirement, while the second set of priorities may be based on the content of the slices.

For example, the one or more first encoded slices 411b are based on the one or more first slices 410b which are prioritized over the one or more second slices 410a, 410c, e.g., based on the content of the one or more first and second slices 410a, 410b, 410c. Thus, the one or more first encoded slices 411b should be prioritized over the one or more further second encoded slices 412a, 412c. This is done by transmitting the one or more first encoded slices 411b as part of the separate first encoded frame 411 which is prioritized over the second encoded frame 412 comprising the one or more further second encoded slices 412a, 412c.

Thus, the image-capturing device 110 transmits the first encoded image frame 411 before the second encoded image frame 412 on the communications network 250 to a receiving device 260, 270, 280, 295. Thus, since the image-capturing device 110 transmits the first encoded image frame 411 before the second encoded image frame 412 the image-capturing device 110 prioritizes the first encoded image frame 411 over the second encoded image frame 412.

The respective horizontal arrow in FIGS. 4b and 4e illustrates transmission time.

FIG. 4b further illustrates how the image-capturing device 110 transmits a further first encoded image frame 421 before a further second encoded image frame 422 according to the same principles as explained above for the first encoded image frame 411 and the second encoded image frame 412. The time interval between a set of the first and second encoded image frames 411, 412 and a second set of the further first and second encoded image frames 421, 422 may be set according to a specific desired frame rate, e.g., 1/30 s.

FIG. 4e further illustrates how the image-capturing device 110 transmits the further second encoded image frame 422 before a further third encoded image frame 423 according to the same principles as explained above.

The image-capturing device 110 may transmit a first indication indicating that the first encoded image frame 411 is not to be displayed to the receiving device 260, 270, 280, 295.

In some embodiments herein the first indication is transmitted in a header of the first encoded image frame 411.

In general, all transmitted encoded frames except the last transmitted encoded frame may comprise an indication, for example in the header of the encoded frame, that the encoded frame is not to be displayed.

In some other embodiments herein the first encoded frame 411 comprises the first indication indicating that only the last encoded frame 412 of the encoded frames related to the first encoded frame 411 shall be displayed.

The indication may be implemented as a flag, such as a one-bit flag. By transmitting the first indication the image-capturing device 110 helps the receiver device 295 to understand how to display the content of the encoded frames.

In some embodiments herein the image-capturing device 110 transmits a second indication indicating how the image frame 311, 410 is divided into the multiple slices 410a, 410b, 410c to the receiving device 260, 270, 280, 295. By transmitting the second indication image partitioning may be dynamic.

Also the second indication may be sent in one or more headers.

When there are three encoded image frames then the method may further comprise transmitting the second encoded image frame 412 before the third encoded image frame 413 on the communications network 250 to the receiving device 260, 270, 280, 295.

At the receiver side the received encoded frames are decoded as normal. The decoded frames may then be combined into a single frame which is to be displayed. For example, decoding of the second image may reuse blocks from the first decoded image when they are skip blocks. In other words, decoded data from the first decoded image frame may be copied to the second decoded image frame which is then displayed. Thus, one or more decoded frames may not be displayed. In particular, in some embodiments only the result after the last frame will be displayed, containing all slices. This may for example be indicated by the first indication.

If the second encoded frame is dropped on the network and the receiving device 260, 270, 280, 295 knows that the first encoded frame is not to be displayed, e.g., if it includes the first indicator, then the receiving device 260, 270, 280, 295 will anyway display the next set of decoded frames correctly.

A complete embodiment will now be presented schematically:

The input image is encoded into three slices of equal size.

The slices are separated into three separate frames, with the empty areas replaced with pre-generated empty slices, e.g., indicated with QP-value=51.

The frames are arranged so that the frame with the most prioritized slice is placed first.

The two first frames are marked as no-display.

Each frame is sent as one or more network packets. For example, each slice may result in a packet. drops are most likely to impact frame #2 or #3.

Decode the frames as normal, only the result after the last frame will be displayed, containing all slices of data.

Thus, according to embodiments herein multiple encoded image frames may be generated from a single input frame. The number of encoded image frames may correspond or be equal to a number of priority groups for the slices which make up the frames. A respective encoded image frame, corresponding to a particular priority group, may comprise slices which are generated by the encoder by encoding a corresponding input slice from the corresponding priority group, and skip blocks instead of encoded slices from other priority groups. At the receiver side the multiple encoded frames are decoded and the decided slices are combined and displayed as normal.

Thus, some embodiments herein disclose a method in a video camera. The method may include:

receiving frame data from the image sensor of the video camera;

dividing the received frame into several slices, such as two slices.

setting priorities on the slices;

constructing a first frame from video data in a prioritized slice and skip blocks in non-prioritized slices, e.g., the prioritized slice is image coded, i.e., it is updated with respect to a previous video frame;

constructing a second frame from video data in the non-prioritized slice and skip blocks in the prioritized slice;

transmitting the first and second frame on a communication network to a receiving device.

Figure 6:
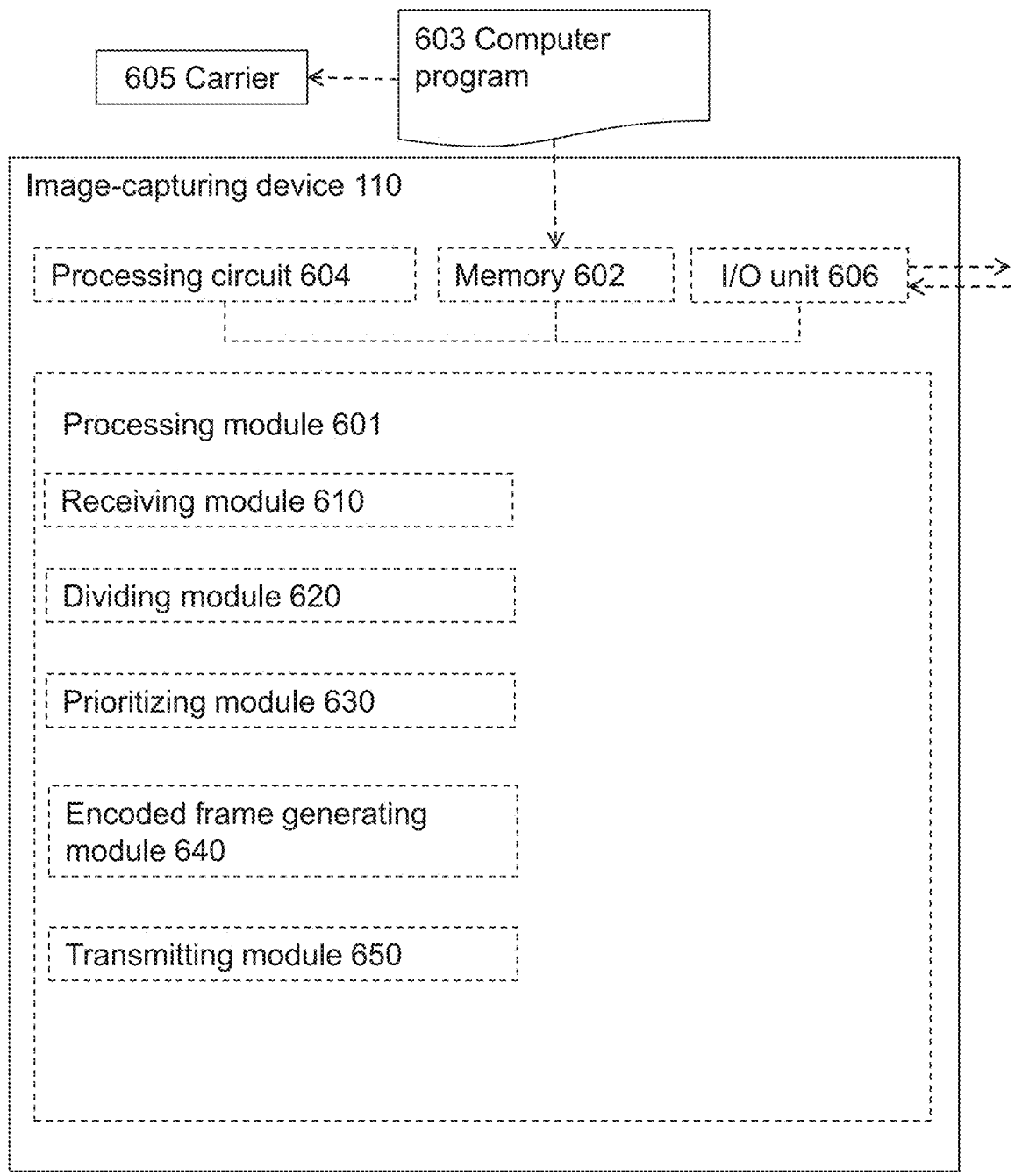
FIG. 6 is a block diagram illustrating embodiments of the image-capturing device.

With reference to FIG. 6, a schematic block diagram of embodiments of the image-capturing device 110 is shown. As mentioned above, the image-capturing device 110 is configured to encode the image frames 311, 410 of the image stream 310 and transmit the encoded image frames 411, 412 on the communications network, such as the video network system 250.

As mentioned above, the image-capturing device 110 may comprise any of the camera, the video camera 120, the surveillance camera, the monitoring camera or the camcorder, the network video recorder, and the wireless communication device 130.

In particular, the image-processing device 110 may be the video camera 120, such as a surveillance camera.

The image-processing device 110 may comprise the encoder 303 configured to perform one or more of the actions of the method according to FIG. 5. For example, the encoder 303 may be configured to encode an input image frame into at least two encoded image frames based on the method described above in relation to FIG. 5.

The image-capturing device 110 may further comprise a processing module 601, such as a means for performing the methods described herein. The means may be embodied in the form of one or more hardware modules and/or one or more software modules.

The image-capturing device 110 may further comprise a memory 602. The memory may comprise, such as contain or store, instructions, e.g. in the form of a computer program 603, which may comprise computer readable code units which when executed on the image-capturing device 110 causes the image-capturing device 110 to perform the method of encoding the image frames 311, 410 of the image stream 310 and transmitting the encoded image frames 411, 412 on the communications network 250.

According to some embodiments herein, the image-capturing device 110 and/or the processing module 601 comprises a processing circuit 604 as an exemplifying hardware module, which may comprise one or more processors. Accordingly, the processing module 601 may be embodied in the form of, or 'realized by', the processing circuit 604. The instructions may be executable by the processing circuit 604, whereby the image-capturing device 110 is operative to perform the methods of FIG. 5 as described above. As another example, the instructions, when executed by the image-capturing device 110 and/or the processing circuit 604, may cause the image-capturing device 110 to perform the methods according to FIG. 5.

In view of the above, in one example, there is provided an image-capturing device 110 for encoding the image frames 311, 410 of the image stream 310 and transmitting the encoded image frames 411, 412 on the communications network 250.

Again, the memory 602 contains the instructions executable by said processing circuit 604 whereby the image-capturing device 110 is operative for performing the method according to FIG. 5.

FIG. 6 further illustrates a carrier 605, or program carrier, which comprises the computer program 603 as described directly above. The carrier 605 may be one of an electronic signal, an optical signal, a radio signal and a computer readable medium.

In some embodiments, the image-capturing device 110 and/or the processing module 601 may comprise one or more of a receiving module 610, a dividing module 620, a prioritizing module 630, an encoded frame generating module 640, and a transmitting module 650, as exemplifying hardware modules. In other examples, one or more of the aforementioned exemplifying hardware modules may be implemented as one or more software modules.

In particular, the encoder 303 may comprise one or more or even all of the receiving module 610, the dividing module 620, the prioritizing module 630, the encoded frame generating module 640, and the transmitting module 650.

Thus, the encoder 303 may perform one or more or even all functions of the receiving module 610, the dividing module 620, the prioritizing module 630, an encoded frame generating module 640, and the transmitting module 650.

Moreover, the processing module 601 may comprise an Input/Output unit 606. According to an embodiment, the Input/Output unit 606 may comprise an image sensor configured for capturing the raw image frames described above such as the raw image frames comprised in the first video stream 310 from the image sensor 301.

According to the various embodiments described above, the image-capturing device 110 and/or the processing module 601 and/or the receiving module 610 and/or the encoder 303 is configured to receive the captured image frames 311, 410 of the image stream 310 from the image sensor 301 of the image-capturing device 110.

The image-capturing device 110 and/or the processing module 601 and/or the dividing module 520 and/or the encoder 303 is configured to divide the image frame 311, 410 into multiple slices 410a, 410b, 410c. The multiple slices 410a, 410b, 410c comprises one or more first slices 410b defined by first slice parameters and one or more second slices 410a, 410c defined by second slice parameters The image-capturing device 110 and/or the processing module 601 and/or the prioritizing module 630 is configured to prioritize the multiple slices 410a, 410b, 410c such that the one or more first slices 410b are prioritized over the one or more second slices 410a, 410c.

The image-capturing device 110 and/or the processing module 601 and/or the encoded frame generating module 640 and/or the encoder 303 is configured to generate:

the first encoded image frame 411 comprising one or more first encoded slices 411b defined by the first slice parameters and based on encoding the one or more first slices 410b, and comprising one or more second encoded slices 411a, 411c defined by the second slice parameters and comprising one or more first skip blocks; and the second encoded image frame 412 comprising one or more further second encoded slices 411a, 411c defined by the second slice parameters and based on encoding the one or more second slices 410a, 410c, and comprising one or more further first encoded slices 412b defined by the first slice parameters and comprising one or more second skip blocks.

In some embodiments herein the image-capturing device 110 and/or the processing module 601 and/or the encoded frame generating module 640 and/or the encoder 303 is configured to:

generate the first encoded image frame 411 by being configured to encode the multiple slices 410a, 410b, 410c such that the one or more first slices 410b are encoded into one or more first encoded slices 411b of the first encoded image frame 411 and the one or more second encoded slices 411a, 411c are generated by replacing the one or more second slices 410a, 410c with the second skip blocks; and generate the second encoded image frame 412 by being configured to encode the multiple slices 410a, 410b, 410c such that the one or more second slices 410a, 410c are encoded into the one or more further second encoded slices 411a, 411c of the second encoded image frame 411 and the one or more further first encoded slices 411a, 411c are generated by replacing the one or more first slices 410b with the one or more first skip blocks.

In some embodiments herein the image-capturing device 110 and/or the processing module 601 and/or the encoded frame generating module 640 and/or the encoder 303 is further configured to generate the third encoded image frame 413 comprising one or more further third encoded slices 413c defined by the third slice parameters and based on encoding the one or more third slices 410c, and comprising the one or more further first encoded slices 412b defined by the first slice parameters and comprising the one or more second skip blocks, and comprising the one or more second encoded slices 411a defined by the second slice parameters and comprising the one or more first skip blocks.

The image-capturing device 110 and/or the processing module 601 and/or the transmitting module 650 and/or the encoder 303 is configured to transmit the first encoded image frame 411 before the second encoded image frame 412 on the communications network 250 to the receiving device 260, 270, 280, 295.

The image-capturing device 110 and/or the processing module 601 and/or the transmitting module 650 and/or the encoder 303 may be configured to transmit the first indication that the first encoded image frame 411 is not to be displayed to the receiving device 260, 270, 280, 295.

In some embodiments herein the image-capturing device 110 and/or the processing module 601 and/or the transmitting module 650 and/or the encoder 303 is configured to transmit the first indication in the header of the first encoded image frame 411.

The image-capturing device 110 and/or the processing module 601 and/or the transmitting module 650 and/or the encoder 303 may be configured to transmit the second indication indicating how the image frame 311, 410 is divided into the multiple slices 410a, 410b, 410c to the receiving device 260, 270, 280, 295.

As used herein, the term "module" may refer to one or more functional modules, each of which may be implemented as one or more hardware modules and/or one or more software modules and/or a combined software/hardware module. In some examples, the module may represent a functional unit realized as software and/or hardware.

As used herein, the term "computer program carrier", "program carrier", or "carrier", may refer to one of an electronic signal, an optical signal, a radio signal, and a computer readable medium. In some examples, the computer program carrier may exclude transitory, propagating signals, such as the electronic, optical and/or radio signal. Thus, in these examples, the computer program carrier may be a non-transitory carrier, such as a non-transitory computer readable medium.

As used herein, the term "processing module" may include one or more hardware modules, one or more software modules or a combination thereof. Any such module, be it a hardware, software or a combined hardware-software module, may be a connecting means, providing means, configuring means, responding means, disabling means or the like as disclosed herein. As an example, the expression "means" may be a module corresponding to the modules listed above in conjunction with the figures.

As used herein, the term "software module" may refer to a software application, a Dynamic Link Library (DLL), a software component, a software object, an object according to Component Object Model (COM), a software component, a software function, a software engine, an executable binary software file or the like.

The terms "processing module" or "processing circuit" may herein encompass a processing unit, comprising e.g. one or more processors, an Application Specific integrated Circuit (ASIC), a Field-Programmable Gate Array (FPGA) or the like. The processing circuit or the like may comprise one or more processor kernels.

As used herein, the expression "configured to/for" may mean that a processing circuit is configured to, such as adapted to or operative to, by means of software configuration and/or hardware configuration, perform one or more of the actions described herein.

As used herein, the term "action" may refer to an action, a step, an operation, a response, a reaction, an activity or the like. It shall be noted that an action herein may be split into two or more sub-actions as applicable. Moreover, also as applicable, it shall be noted that two or more of the actions described herein may be merged into a single action.

As used herein, the term "memory" may refer to a hard disk, a magnetic storage medium, a portable computer diskette or disc, flash memory, Random Access Memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), Secure Digital (SD) card, etc. One or more of the aforementioned examples of computer readable medium may be provided as one or more computer program products.

As used herein, the term "computer readable code units" may be text of a computer program, parts of or an entire binary file representing a computer program in a compiled format or anything there between.

As used herein, the terms "number" and/or "value" may be any kind of number, such as binary, real, imaginary or rational number or the like. Moreover, "number" and/or "value" may be one or more characters, such as a letter or a string of letters. "Number" and/or "value" may also be represented by a string of bits, i.e. zeros and/or ones.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

The invention claimed is:

1. A method, performed by an image-capturing device, for encoding image frames of an image stream and transmitting encoded image frames on a communications network, the method comprising:
receiving an image frame of the image stream from an image sensor of the image-capturing device;
dividing the image frame into multiple slices,
wherein the multiple slices comprises one or more first slices defined by first slice parameters and one or more second slices defined by second slice parameters;
prioritizing the multiple slices such that the one or more first slices are prioritized over the one or more second slices;
generating a first encoded image frame comprising:
one or more first encoded slices defined by the first slice parameters and based on encoding the one or more first slices, and
one or more second encoded slices defined by the second slice parameters and comprising one or more first skip blocks,
wherein the first slice parameters comprise at least one of a first slice size or a first slice position within the first encoded image frame, and
wherein the second slice parameters comprise at least one of a second slice size or a second slice position within the first encoded image frame, the at least one of the second slice size or second slice position being different from a corresponding one of the at least one of the first slice size or first slice position;
generating a second encoded image frame comprising one or more further second encoded slices defined by the second slice parameters and based on encoding the one or more second slices, and comprising one or more further first encoded slices defined by the first slice parameters and comprising one or more second skip blocks; and
transmitting the first encoded image frame before the second encoded image frame on the communications network to a receiving device.

2. The method according to claim 1, further comprising transmitting a first indication indicating that the first encoded image frame is not to be displayed to the receiving device.

3. The method according to claim 2, wherein transmitting the first indication comprises transmitting the first indication in a header of the first encoded image frame.

4. The method according to claim 1, wherein generating the encoded image frames comprises: encoding the multiple slices such that a respective encoded slice of multiple encoded slices is independent of every other encoded slice of the multiple encoded slices.

5. The method according to claim 1, further comprising transmitting a second indication indicating bow the image frame is divided into the multiple slices to the receiving device.

6. The method according to claim 1,
wherein generating the first encoded image frame comprises encoding the multiple slices such that the one or more first slices are encoded into one or more first encoded slices of the first encoded image frame and the one or more second encoded slices are generated by replacing the one or more second slices with the second skip blocks; and wherein generating the second encoded image frame comprises encoding the multiple slices such that the one or more second slices are encoded into the one or more further second encoded slices of the second encoded image frame and the one or more further first encoded slices are generated by replacing the one or more first slices with the one or more first skip blocks.

7. The method according to claim 1,
wherein generating the first encoded image frame and generating the second encoded image frame comprises generating an intermediate encoded image frame based on encoding the image frame by encoding the multiple slices such that the one or more first slices are encoded into one or more first encoded slices of the intermediate encoded image frame and the one or more second slices are encoded into one or more second encoded slices of the intermediate encoded image frame, and
wherein generating the first encoded image frame further comprises inserting the one or more first encoded slices of the intermediate encoded image frame into the first encoded image frame and inserting the one or more first skip blocks instead of the one or more second encoded slices of the intermediate encoded image frame, and
wherein generating the second encoded image frame further comprises inserting the one or more second encoded slices of the intermediate encoded image frame into the second encoded image frame and inserting the one or more second skip blocks instead of the one or more first encoded slices of the intermediate encoded image frame into the second encoded image frame.

8. The method according to claim 1,
wherein the multiple slices comprises one or more third slices defined by third slice parameters, and
wherein prioritizing the multiple slices comprises prioritizing the one or more second slices over the one or more third slices, and
wherein the generated first encoded image frame further comprises one or more third encoded slices defined by the third slice parameters and comprising one or more third skip blocks, and
wherein the generated second encoded image frame further comprises the one or more third encoded slices, the method further comprising:
generating a third encoded image frame comprising one or more further third encoded slices defined by the third slice parameters and based on encoding the one or more third slices, and comprising the one or more further first encoded slices defined by the first slice parameters and comprising the one or more second skip blocks, and comprising the one or more second encoded slices defined by the second slice parameters and comprising the one or more first skip blocks; and
transmitting the second encoded image frame before the third encoded image frame on the communications network to the receiving device.

9. The method according to claim 1, wherein each skip block of the one or more first skip blocks and the one or more second skip blocks indicates that there is no encoded difference between the encoded image frame including the skip blocks and a previous encoded image frame for a part of the encoded image frame that the skip blocks cover.

10. The method according to claim 1, wherein the multiple slices are of equal size.

11. A non-transitory computer program storage device that comprises computer readable code units which when executed on an image-processing device causes the image-processing device to perform the method according to claim 1.

12. An image-processing device comprising:
- a processor configured to perform a method for encoding image frames of an image stream and transmitting encoded image frames on a communications network, the processor configured to:
- receive an image frame of the image stream from an image sensor of an image-capturing device;
- divide the image frame into multiple slices,
- wherein the multiple slices comprises one or more first slices defined by first slice parameters and one or more second slices defined by second slice parameters;
- prioritize the multiple slices such that the one or more first slices are prioritized over the one or more second slices;
- generate a first encoded image frame comprising:
  - one or more first encoded slices defined by the first slice parameters and based on encoding the one or more first slices, and
  - one or more second encoded slices defined by the second slice parameters and comprising one or more first skip blocks,
  - wherein the first slice parameters comprise at least one of a first slice size or a first slice position within the first encoded image frame, and
  - wherein the second slice parameters comprise at least one of a second slice size or a second slice position within the first encoded image frame, the at least one of the second slice size or second slice position being different from a corresponding one of the at least one of the first slice size or first slice position;
- generate a second encoded image frame comprising one or more further second encoded slices defined by the second slice parameters and based on encoding the one or more second slices, and comprising one or more further first encoded slices defined by the first slice parameters and comprising one or more second skip blocks; and
- transmit the first encoded image frame before the second encoded image frame on the communications network to a receiving device.

13. The image-processing device according to claim 12, wherein the processor is further configured to transmit a first indication indicating that the first encoded image frame is not to be displayed to the receiving device.

14. The image-processing device according to claim 12, wherein the image-processing device is a video camera.

* * * * *